(12) United States Patent
Black et al.

(10) Patent No.: US 9,313,221 B2
(45) Date of Patent: Apr. 12, 2016

(54) DETERMINATION OF SPOOFING OF A UNIQUE MACHINE IDENTIFIER

(75) Inventors: Chuck A Black, Rocklin, CA (US); Daniel E Ford, Granite Bay, CA (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 0 days.

(21) Appl. No.: 14/372,517

(22) PCT Filed: Jan. 31, 2012

(86) PCT No.: PCT/US2012/023403
§ 371 (c)(1),
(2), (4) Date: Jul. 16, 2014

(87) PCT Pub. No.: WO2013/115807
PCT Pub. Date: Aug. 8, 2013

(65) Prior Publication Data
US 2014/0359763 A1      Dec. 4, 2014

(51) Int. Cl.
| | |
|---|---|
| *H04L 29/06* | (2006.01) |
| *H04W 12/08* | (2009.01) |
| *H04W 12/12* | (2009.01) |
| *H04L 12/26* | (2006.01) |
| *G06F 11/00* | (2006.01) |
| *G06F 12/14* | (2006.01) |
| *G06F 12/16* | (2006.01) |
| *G08B 23/00* | (2006.01) |

(52) U.S. Cl.
CPC ............ *H04L 63/1425* (2013.01); *H04L 43/10* (2013.01); *H04W 12/08* (2013.01); *H04W 12/12* (2013.01); *H04L 63/1466* (2013.01)

(58) Field of Classification Search
None
See application file for complete search history.

(56) References Cited

U.S. PATENT DOCUMENTS

| | | | |
|---|---|---|---|
| 2004/0186989 A1* | 9/2004 | Clapper | 713/151 |
| 2005/0128989 A1 | 6/2005 | Bhagwat | |
| 2006/0114863 A1* | 6/2006 | Sanzgiri et al. | 370/338 |
| 2006/0197702 A1* | 9/2006 | Jones | 342/126 |
| 2007/0121596 A1 | 5/2007 | Kurapati | |
| 2007/0169192 A1* | 7/2007 | Main et al. | 726/22 |
| 2008/0214157 A1* | 9/2008 | Ramer et al. | 455/414.1 |
| 2008/0244707 A1* | 10/2008 | Bowser et al. | 726/4 |
| 2008/0250498 A1* | 10/2008 | Butti et al. | 726/23 |
| 2009/0119741 A1* | 5/2009 | Palnitkar et al. | 726/1 |
| 2009/0260083 A1* | 10/2009 | Szeto et al. | 726/22 |

(Continued)

FOREIGN PATENT DOCUMENTS

| | | |
|---|---|---|
| JP | 2002007261 A | 1/2002 |
| JP | 2011134251 A | 7/2011 |
| WO | 2010/050983 A1 | 5/2010 |

OTHER PUBLICATIONS

Extended European Search Report, EP Application No. 12867028.8, Date: Jul. 2, 2015, pp. 1-8.

(Continued)

*Primary Examiner* — Shin-Hon Chen
(74) *Attorney, Agent, or Firm* — Hewlett Packard Enterprise Patent Department

(57) ABSTRACT

In one embodiment, an edge network device may monitor a network service that is provided at a network service device. Information related to the monitored network service may be temporarily stored at the edge network device and transmitted to a remote network device. In one embodiment, an administrative device may compare current extracted information with stored historical information to determine if a unique machine identifier of an end user device has been spoofed.

19 Claims, 5 Drawing Sheets

(56) References Cited

U.S. PATENT DOCUMENTS

| | | | |
|---|---|---|---|
| 2010/0115610 A1* | 5/2010 | Tredoux et al. | 726/19 |
| 2010/0262688 A1* | 10/2010 | Hussain et al. | 709/224 |
| 2010/0284288 A1* | 11/2010 | Lee et al. | 370/252 |
| 2011/0010769 A1 | 1/2011 | Jarredal | |
| 2011/0030032 A1 | 2/2011 | Baykal | |
| 2013/0242795 A1* | 9/2013 | Heen et al. | 370/252 |

OTHER PUBLICATIONS

Ivancsy et al, "Analysis of Web User Identification Methods," 2007, < http://www.waset.org/journals/ijece/v2/v2-3-28.pdf > On pp. 212-219.

Mahoui et al, "Data Mining Forweb Security: Userwatcher," 2001, < https;//www.cerias.purdue.edu/assets/pdf/bibtex_archive/2001-20,pdf >.

Melnikov et al, "Cybermetrics: User Identification Through Network Flow Analysis," 2010, < http://dl.acm.org/citation.cfm?id=1875904 > On pp. 167-170; vol. 6155>.

Jurica Seva et al., "Using User-specific Behavioral Patterns to Describe Users in a Closed Web Environment," 2010, 1-page, Purdue University; Available at: www.cerias.purdue.edu/assets/symposium/2010-posters/A0F-1A4.pdf.

Office Action, EP Application No. 12867028.8, Date: Feb. 4, 2016, pp. 1-6.

* cited by examiner

DETERMINATION OF SPOOFING OF A UNIQUE MACHINE IDENTIFIER

CROSS-REFERENCE TO RELATED APPLICATION

This application is a national stage application under 35 U.S.C. §371 of PCT/US2012/023403, filed Jan. 31, 2012.

BACKGROUND

Networks typically have operating therein multiple devices including an end user device, an edge network device, an administrative device that administers the network, and other network devices. The end user device may access network devices within the network through an edge network device.

Network interfaces on network devices have a unique machine identifier, for example, a media access control (MAC) address. When the end user device registers in the network, certain rights, services, resources, etc., may be assigned to the end user device and associated with the unique machine identifier. Thus, when the end user device accesses the network, the end user device has access to those rights, services, resources, etc., that are assigned to and associated with the unique machine identifier of the end user device.

DRAWINGS

FIG. 1. is an example diagram of a system environment, in accordance with an example embodiment of the present disclosure.

DETAILED DESCRIPTION

When an end user device registers in a network, certain rights may be assigned to the end user device and associated with a unique machine identifier of the end user device. Thus, when an end user device accesses the network, the end user device may utilize the rights that were assigned based on the unique machine identifier of the end user device.

Spoofing of a unique machine identifier of an end user device, for example, a MAC address, occurs when the MAC address assigned to a particular network interface of a device is changed to obtain rights, access to resources, etc., of another end user device. This may be done in order to, for example, avoid access control lists on servers or routers thereby hiding a device on the network, accessing portions of the network that would be otherwise inaccessible, or allowing the device to impersonate another network device.

Determination of a spoofing device that spoofs a unique machine identifier of an end user device is discussed herein. Generally, the user of an end user device has certain network access habits, for example, accessing the same website during the same day or a particular time of day, logging onto the network at a particular time at a particular location, accessing the same services upon logging into the network, etc. Thus, determination of a spoofing event may occur based on information that may be, for example, extracted from, or related to, requests from an end user device. The information may be extracted at an edge network device and stored. The extracted information may be transmitted to an administrative device and stored. The extracted information may be compared with extracted historical information of the end user device. A determination may be made if the unique machine identifier of the end user device has been spoofed based on the comparison of the newly, or current, extracted information with the historical information.

System Environment

Figure 1:
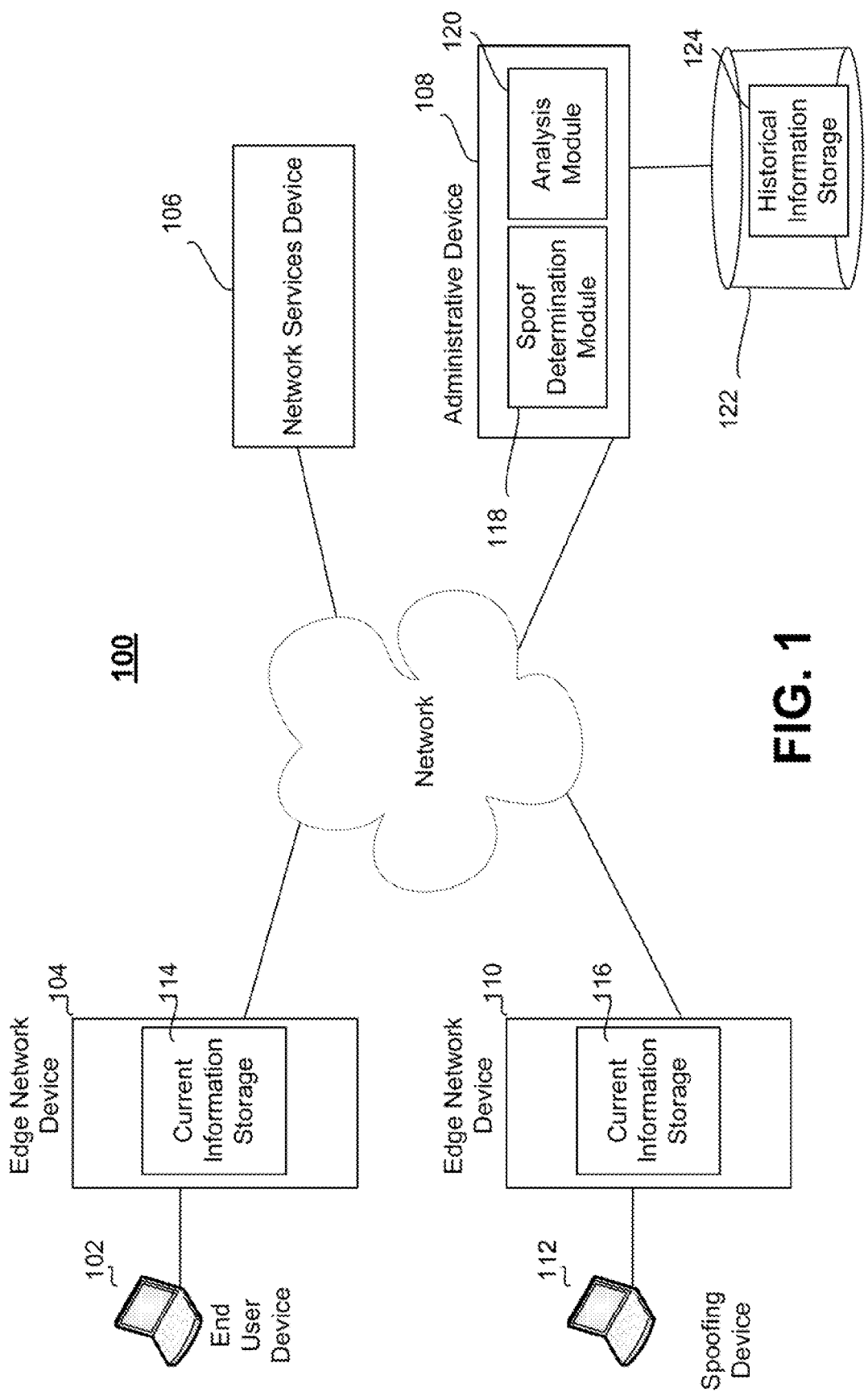

FIG. 1 is an example system environment 100 in accordance with an example embodiment of the present disclosure. As shown in FIG. 1, system environment 100 includes end user device 102, edge network device 104, network device 106 and administrative device 108. System environment may further include edge network device 110 and spoofing device 112. The devices depicted in FIG. 1 operate in a network wherein the network may be implemented as one or more of any wide area network (WAN) or local area network (LAN) in accordance with the functionality as discussed herein. For example, one or more networks may be implemented as any wired or wireless network, including an enterprise network, Global System for Mobile Communication (GSM) network, wideband code division multiple access (WCDMA), general packet radio services (GPRS), personal communication services (PCS), worldwide interoperability for microwave access (WiMAX), local area network (LAN), WAN, for example, the Internet, etc. It may be appreciated additional devices may be incorporated in system environment 100.

Edge network device 104, edge network device 106, and administrative device 108 may be implemented through any suitable combinations of software including machine readable instructions, firmware, including machine readable instructions, and/or hardware. Edge network device 104, edge network device 106, and administrative device 108 may include primary and secondary memory that may be computer-readable mediums configurable to store machine readable instructions, executable by a processor, as discussed herein. Primary and/or secondary memory may further be configurable to receive an installation pack from an external memory, for example, a portable computer-readable medium, for example, a Compact Disc/Digital Video Disc, etc. Edge network device 104 and administrative device 108 may include secondary memory that may be implemented within the device and/or may be implemented as external data storage.

End user device 102 and spoofing device 112 may be implemented as any computing device, for example, a laptop computer, a desktop computer, a mobile computing device, a personal digital assistant (PDA), etc. End user device 102 may be communicably linked to edge network device 104 and may access the network through edge network device 104. Spoofing device 112 may be an end user device that is spoofing a unique machine identifier of an end user device and may be implemented as any computing device, for example, a laptop computer, a desktop computer, a mobile computing device, a personal digital assistant, (PDA), tablet computing device, etc. Spoofing device 112 may be communicably linked to edge network device 110 and may access the network through edge network device 110. It may be appreciated that environment 100 may include additional end user devices, spoofing device and edge network devices.

In one embodiment, end user device 102 may optionally include spoof protection module (not shown) as more fully discussed below. In this embodiment, spoofing device 112 may not include a spoof protection module.

Edge network device 104 and edge network device 110 may be implemented as, for example, an edge network switch, an edge network router, an edge controller, a wireless edge access point, a wireless edge router, etc. Edge network device 104 and edge network device 110 may be considered an edge network device as they are located on the edge of the network, namely, they are directly communicably linked to an end user device 102 or a spoofing device 112 where there is no intermediate computing device that facilitates communication between the edge network device and the end user device or spoofing device.

Edge network device 104 may be directly communicably linked to end user device 102. Edge network device 104 may be the point of entry for end user device 102 into the network. Edge network device 104 may be communicably linked to network device 106.

Edge network device 110 may be directly communicably linked to spoofing device 112. Edge network device 110 may be the point of entry for spoofing device 112 into the network. Edge network device 110 may be communicably linked to network device.

It may be appreciated that additional network devices may reside in the communication path between edge network devices 104, 110 and network device 106, for example, one or more routers, switches, etc. Edge network devices 104, 110 may be communicably linked to administrative device 108. It may be appreciated that additional network devices may reside in the communication path between edge network device 104 and administrative device 108, for example routers, switches, etc.

Edge network device 104 may include current information storage 114 to store current information related to the end user device 102, and requests thereof, and associated with a unique machine identifier of end user device 102. This is discussed more fully below.

Edge network device 110 may include current information storage 116 to store current information related to the spoofing device 112 and associated with a unique machine identifier of spoofing device 112. This is discussed more fully below.

Administrative device 108 may be communicably linked to edge network device 104, network device 106, and edge network device 110. Administrative device may include spoof determination module 118 and analysis module 120, as more fully discussed below. Administrative device 108 may further include analyzer module 120 as more fully discussed below. Administrative device may include, or be communicably linked to, storage 122. Storage 122 may include historical information 124, as more fully discussed below.

As discussed herein, each device in system environment 100 may include a unique machine identifier, for example, a media access control (MAC) address, an Internet protocol (IP) address, etc.

Edge Network Device

Figure 2:
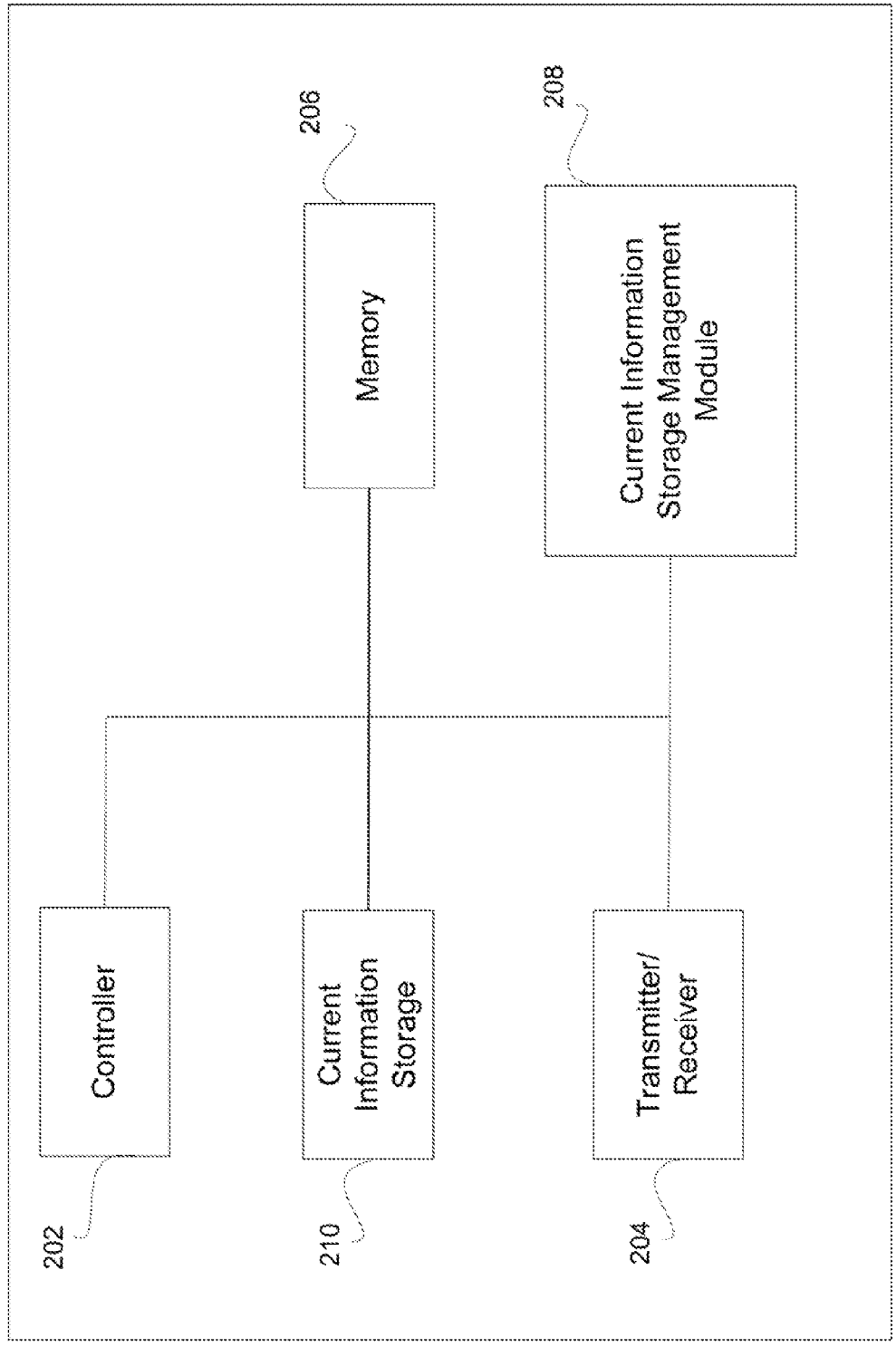
FIG. 2 is an example diagram of an edge network device in accordance with an example embodiment of the present disclosure.

FIG. 2 depicts an example edge network device. Edge network devices 104 and 110 may be implemented as discussed with regard to FIG. 2. As shown in FIG. 2, edge network device includes controller 202, memory 206, current information storage management module 208 and current information storage 210, in addition to components to facilitate networking operation (not shown). Current information storage management module 208 may be implemented in software in the form of computer-executable instructions, stored in a computer-readable storage medium that, when executed by a processor, realize the functionality as discussed herein.

Current information storage management module 208 may facilitate receipt of one or more requests from an end user device to access a device in the network. The current information storage management module 208 may extract information related to one or more requests. This information may include:

browsing information, for example, information about web sites in the network, for example, a host name, a web page, etc.; the extracted data in the form of a universal resource location (URL) address;

information related to services/applications accessed by the end user device, for example, email server, proxy server, application running on a server in the network, etc., the extracted data in the form of, for example, a transmission control (TCP) port number, a user datagram protocol (UDP) port number, etc.; and location information identifying a location of the end user device, in the form of the edge network device, for example, Internet Protocol (IP) address, etc., and/or port from which the end user device is accessing the network, etc.

The extracted information may be associated with a unique machine identifier of the end user device that transmitted the request and stored in current information storage 210. It may be appreciated that other information related to the end user device may be extracted and stored.

Current information storage 210 may be implemented within the edge network device where current information associated with the unique machine identifier of the end user device may be stored. Browsing information, service/application information, location information, etc., associated with a unique machine identifier of the end user device, may be stored in one or more tables in current information storage 210.

It may be appreciated that location information may be separately transmitted to administrative device 108 where administrative device 108 may store the information in storage 124. For example, when the end user device first accesses the network, the edge network device may then transmit the location information to the administrative device.

Current information storage management module 208 may transmit the current information stored in current information storage 210 to the administrative device 108. This information may be transmitted upon extraction, at predetermined time intervals, for example, every minute, every five minutes, every hour, etc. The transmission of stored current information may be configurable through a user interface at the edge network device, at the administrative device 108, etc. (not shown). Once the current information is transmitted to the administrative device 108, the current information may be deleted from the current information storage 210.

Controller 202 may control receipt and transmission of requests from an end user device to other devices in the network and may facilitate extraction and storage of the current information by the current information storage management module 208.

Network Device

Network device 106 may be implemented as one or more computing devices co-located or located remote from each other. Network services device 108 may be located anywhere in the network, including the edge of the network, a data center, a campus, a branch, etc. Network services device may be implemented as one more devices including name server, for example, dynamic host configuration protocol (DHCP) server, domain name system (DNS), web server, internet service provider server, electronic mail server, printer server, remote authentication dial-in user service (RADIUS) server, an Oracle database, SAP, Iron Mountain PC Backup Server, Norton Anti-Virus Server, lightweight directory access protocol (LDAP), etc. Network services device 106 may be communicably linked either directly or through one or more intermediary network devices, for example, routers switches, etc., to edge network device 104. It may be appreciated that any service that is provided in a network may be monitored in accordance with the features discussed herein.

Administrative Device

Figure 3:
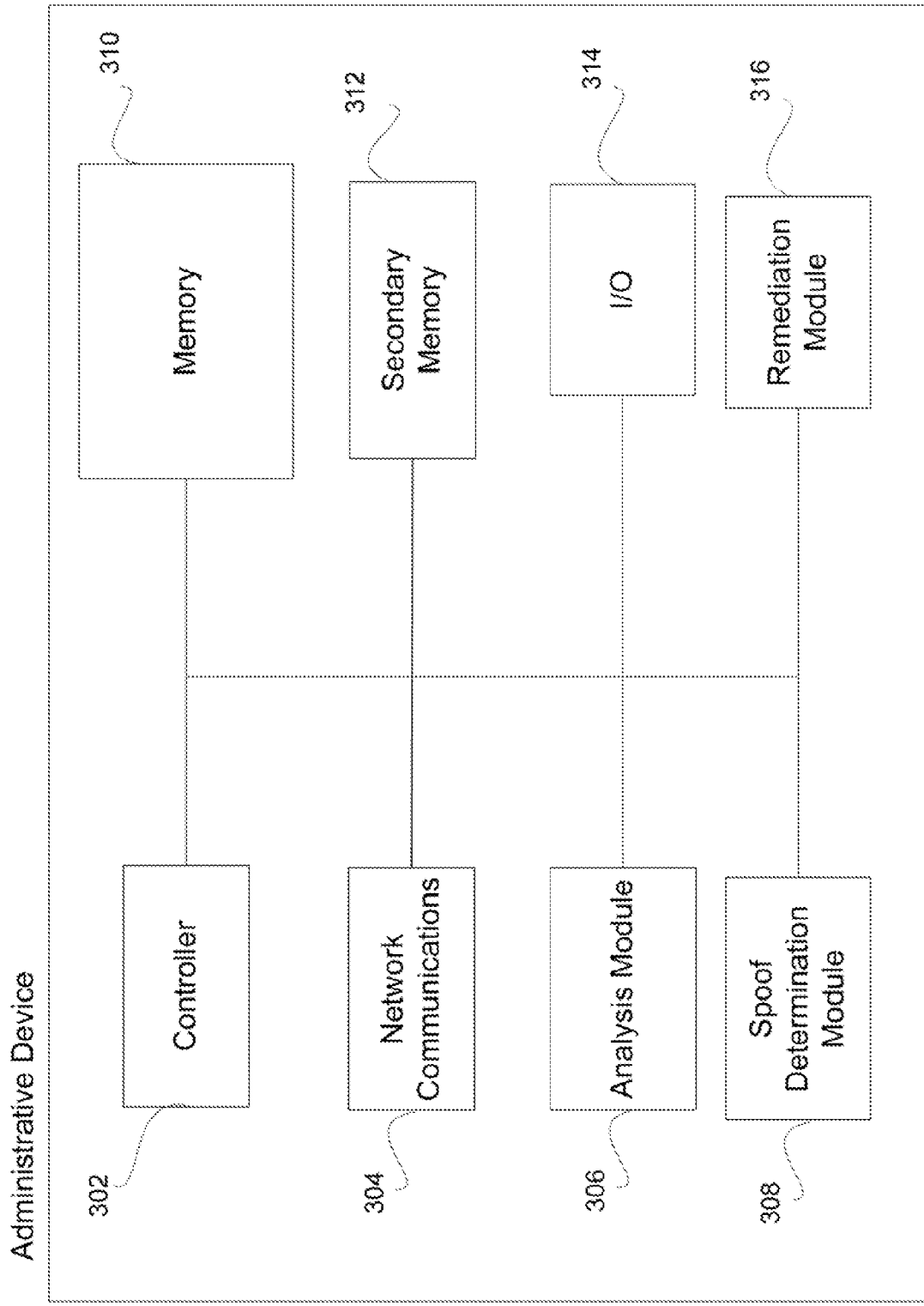
FIG. 3 is an example diagram of an administrative device in accordance with an example embodiment of the present disclosure.

FIG. 3 depicts an example administrative device. Administrative device 108 may be implemented as discussed with regard to FIG. 3. As shown in FIG. 3, administrative device includes controller 302, network communications 304, analysis module 306, spoof determination module 308, memory 310, secondary memory 312, and input/output devices 314. Administrative device may optionally include remediation module 316.

Controller 302 may facilitate functionality discussed with respect to the administrative device as discussed herein.

Network communications 304 may, among other things, receive current information associated with a unique machine identifier of an end user device.

Secondary memory 312 may store current information associated with a unique machine identifier, as received from an edge network device.

Secondary memory 312 may further store historical information associated with a unique machine identifier. Historical information may be current information that was received from an edge network device, but has become historical information based on, for example, passage of a predetermined period of time, receipt of new current information associated with the same unique machine identifier, initiation of a new network session by the end user device having the unique machine identifier, conclusion of a network session by the end user device having the unique machine identifier, after analysis and/or comparison of the current information with the historical information, etc.

Analysis module 306 may access information, including current and historical information, associated with a unique machine identifier and stored in secondary storage 312 and perform statistical analysis in order to determine the similarity between the current and historical data. The analysis may include determining the variance between the two sets of data, the standard deviation, etc.

Alternatively, current information may be stored in memory 316, and accessible by analysis module 306, in order for analysis to be performed on the current information and compared with the historical information before being stored in secondary storage 312. This may help to ensure that the historical data is data relating to the end user device, and not a spoofing device.

Spoof determination module 308 may receive the results of analysis of the information from analysis module 306 and determine whether a unique machine identifier is being spoofed. This determination may be made, for example, by setting thresholds such that when the results of the analysis module exceed a predefined threshold, it may be determined that a spoofing operation may have taken place.

Alternatively, the spoof determination module may include an additional check to determine if a spoofing operation has taken place by attempting to communicate with a spoof protection module at the end user device, as more fully discussed below.

Administrative device may include remediation module 316. Remediation module 316 may implement measures to restrict or deny access to one or more portions of the network based on determination of an end user device spoofing a unique machine identifier. These measures may include issuing an alert to one or more devices within the network including information related to the spoofing determination, for example, the spoofing event, the location of the spoofing device, etc.; cutting off the spoofing device's access to the network, restricting the spoofing device's access to one or more portions of the network; etc.

Analysis module 306, spoof determination module 308 and remediation module 316 may be implemented as machine-readable instructions, stored in a machine readable medium at the administrative device, executable by a controller to perform the functionality as discussed with each of those modules.

End User Device

End user device may include a spoof protection module stored thereon and may be associated with the unique machine identifier of the end user device. Spoof protection module may be implemented as one or more machine readable instructions, stored in a machine readable medium, executable by a controller.

The administrative device may have stored therein information associating the unique machine identifier of the end user device, with information relating to the spoof protection module stored at the end user device.

Spoof protection module may be accessible by administrative device, such that, if a spoof event is determined by the spoof determination module at the administrative device, prior to remediation, the spoof determination module may attempt to communicate with the spoof determination module at the end user device. This may be accomplished, for example, by the administrative device sending an acknowledgement request to the spoof protection module. If successful communication is made with the spoof protection module, the spoof protection module may transmit a response to the acknowledgement request. Upon receipt of the acknowledgement request, the administrative device may not take any remediation measures, having confirmed that the unique machine identifier has not been spoofed. However, if the administrative device does not receive a response to the acknowledgement request, then remediation measures may be taken against the spoofing device.

Current Information Storage at Edge Network Device

Current information storage, at the edge network device, may be implemented as, for example, a table storing current information associated with the unique machine identifier of end user device 102. For example, each unique machine identifier may have associated there with a table storing information extracted from requests received from the end user device having the unique machine identifier. The table may be configured such that one axis includes information related to a network device or network service that the end user device is requesting access to. The other axis may include time. Time may include date, day of week, hour, minute, etc.

When a request is received from an end user device, information regarding the request may be extracted. This information may include address of a website, host name, web page, etc. When the information is extracted, the table associated with the unique machine identifier is updated indicating that the end user device has requested access to that network device. This indication may be made in the form of a counter that counts the number of times access is requested for a particular website, host name, web page, etc., during a particular time period.

Periodically, the information in the table, as associated with the unique machine identifier is transmitted to the administrative device and the counter information is deleted. This may be time-based, for example, during a predefined time interval, or event based, for example, based on user network access session, etc.

Information extracted from new requests received from the end user device is stored in the table and the process repeats.

Spoof Determination Process

Figure 4:
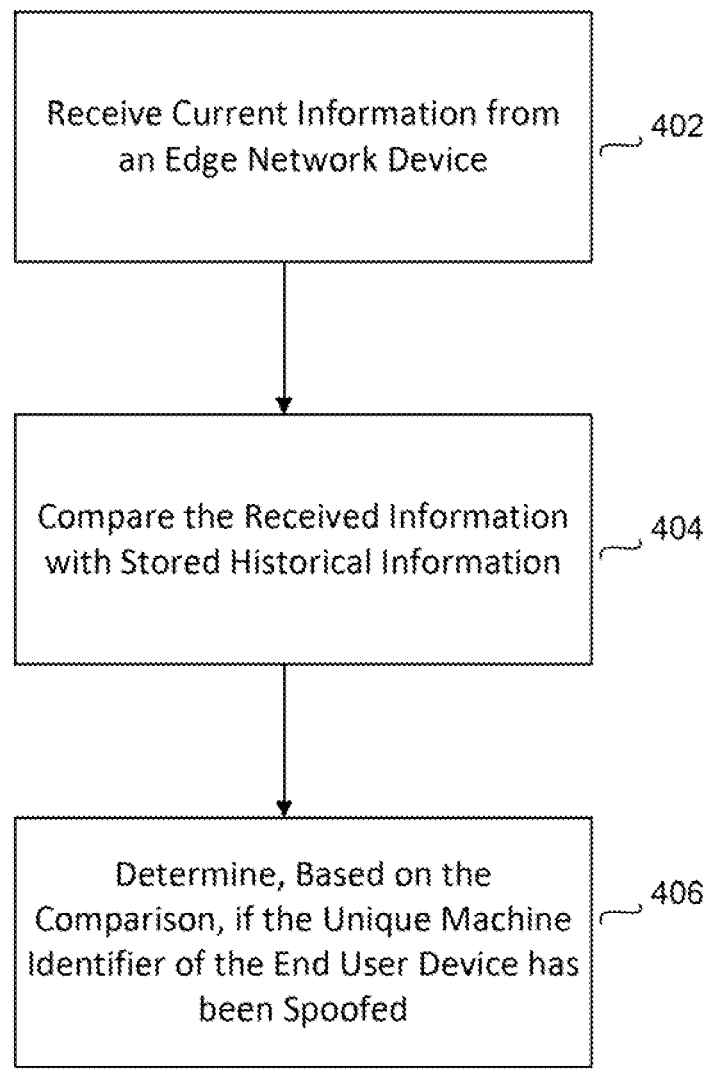
FIG. 4 is an example flow diagram of a method to determine if a unique machine identifier of an end user device has been spoofed, in accordance with an example embodiment of the present disclosure.

FIG. 4 depicts an example flow diagram of a method for determining if a unique machine identifier of an end user device has been spoofed in accordance with an example embodiment. The method, as discussed with regard to FIG. 4, may be implemented at an administrative device. As shown in FIG. 4, current information is received from an edge network device, the received current information associated with a media access control (MAC) address of an end user device (402). The current information may be received in the form of a request from the end user device having a unique machine identifier. The received information may be compared with stored historical information associated with the unique machine identifier of the end user device (404). A determination may be made, based on the comparison, if the unique machine identifier of the end user device has been spoofed (406).

In one embodiment, the determination of whether the unique machine identifier of the end user device has been spoofed may include a query from the administrative device to the end user device. The query may be, for example, an acknowledgement request to a spoof protection module at the end user device. If a response to the acknowledgement request is received, then it may be determined that the unique machine identifier has not been spoofed. If a response has not been received, then it may be determined that the unique machine identifier has been spoofed and remediation measures may be employed, for example, denying network access to the end user device, restricting a portion of network access to the end user device, and issuing an alert that address of the end user device has been spoofed.

The received information may relate to browsing information of the end user device, may identify a service the end user device has accessed, may identify a physical location on the end user device, etc.

If a determination is made that the end user device has been spoofed, remediation may be performed, including at least one of denying network access to the end user device, restricting a portion of network access to the end user device, and issuing an alert that address of the end user device has been spoofed.

It may be appreciated that the method described with respect to FIG. 4 may be performed upon receipt of any current information from the edge network device (after historical information has been previously collected); periodically, randomly, etc, and may be configured via a graphical user interface.

The current information may be stored in secondary storage as historical information.

In one embodiment, prior to any current information being stored as historical information, analysis and/or comparison of the current information with the historical information may be performed to determine if the unique machine identifier of the end user device has been spoofed. If it is determined that the unique machine identifier of the end user device has not been spoofed, then the current information may be stored as historical information and associated with the unique machine identifier, thus ensuring the integrity of the historical information. If the unique machine identifier has been spoofed, then the current information may not be stored as historical information associated with the spoofed unique machine identifier.

Figure 5:
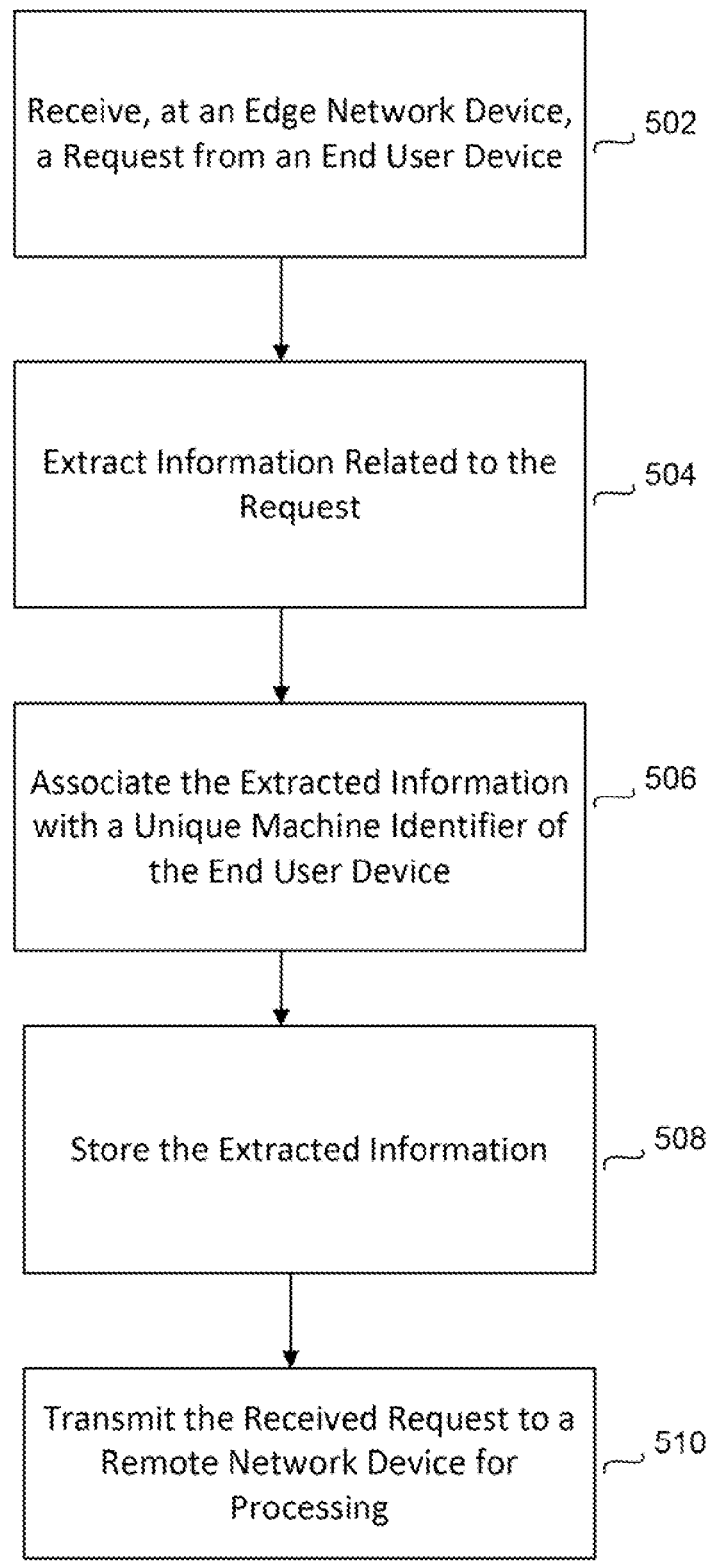
FIG. 5 is an example flow diagram of a method to extract information at an edge network device, in accordance with an example embodiment of the present disclosure.

FIG. 5 depicts an example flow diagram of a method for extracting information related to a request in accordance with an example embodiment. The method as discussed with regard to FIG. 5 may be implemented at an edge network device. As shown in FIG. 5, a request from an end user device may be received at an edge network device (502). Information related to the request may be extracted from the request (504). The extracted information may be associated with a unique machine identifier of the end user device (506). The extracted information may be stored at the edge network device (508). The received request may be transmitted to a remote network device for processing (510).

The stored extracted information, associated with the unique machine identifier, may be transmitted to an administrative device. Once the stored extracted information is transmitted to the administrative device, the information in the storage may be deleted. Newly extracted information, associated with the unique machine identifier, may be stored in storage and the process may repeat.

It may be appreciated that the method described with respect to FIG. 5 may be performed upon receipt of all requests from the end user device; periodically, randomly, etc.

The stored extracted information associated with the unique machine identifier may be transmitted to an administrative device and removed, or deleted, from current information storage.

We claim:

1. A method, comprising:
    receiving, at an administrative device, current browsing information from an edge network device, the received current browsing information associated with a media access control (MAC) address of an end user device;
    sending, by the administrative device, an acknowledgment request to the end user device;
    determining, by the administrative device, if an acknowledgement is received from the end user device in response to the acknowledgement request;
    if the acknowledgement is not received at the administrative device from the end user device:
        determining, based on a comparison of the received current browsing information with stored historical information associated with the MAC address of the end user device, whether the MAC address of the end user device has been spoofed.

2. The method of claim 1, wherein the current browsing information is stored in the edge network device, wherein the edge network device is a wireless access point directly connected to the end user device.

3. The method of claim 1, wherein receiving current information from the edge network device includes:
receiving current information identifying a service the end user device has accessed.

4. The method of claim 1, wherein receiving current information from the edge network device includes:
receiving current information identifying a physical location of the end user device.

5. The method of claim 1, further comprising:
performing remediation if it is determined the MAC address of the end user device has been spoofed.

6. The method of claim 5, wherein performing remediation includes at least one of denying network access to the end user device, restricting a portion of network access to the end user device, and issuing an alert that address of the end user device has been spoofed.

7. The method of claim 1, wherein the edge network device stores a table including a plurality of entries, wherein each entry of the plurality of entries includes browsing information uniquely associated with one of a plurality of MAC addresses.

8. The method of claim 1, wherein each of the plurality of MAC addresses uniquely identifies one of a plurality of end user devices, wherein each of the plurality of end user devices has directly connected to the edge network device.

9. An apparatus, comprising:
a memory, storing a set of instructions; and
a processor, to execute the stored set of instructions, the processor to:
receive, from an edge network device, current browsing information associated with a media access control (MAC) address of an end user device;
send an acknowledgment to an end user device;
determine whether an acknowledgement is received from the end user device in response to the acknowledgement request;
if the acknowledgement is not received from the end user device:
compare the current browsing information associated with the unique machine identifier to historical information associated with the MAC address of the end user device to determine, based on a result of the comparison, whether the MAC address of the end user device has been spoofed.

10. The apparatus of claim 9, the processor further to:
at least one of deny network access to the end user device, restrict a portion of network access to the end user device, and issue an alert that address of the end user device has been spoofed if it is determined that the MAC address of the end user device has been spoofed.

11. The apparatus of claim 9, further comprising:
a receiver to periodically receive information from an edge network device, the information being associated with the MAC address of the end user device.

12. The apparatus of claim 9, wherein when the processor is to compare current information with historical information, the processor is further to determine if the comparison result exceeds a predetermined threshold thereby determining the MAC address of the end user device has been spoofed.

13. The apparatus of claim 9, wherein the current browsing information is stored in the edge network device.

14. The apparatus of claim 9, wherein the edge network device is a wireless access point directly connected to the end user device.

15. A non-transitory computer-readable medium, storing a set of instructions, executable by a processor, to perform a method comprising:
receiving, at an administrative network device, current browsing information from an edge network device, the received current browsing information associated with a media access control (MAC) address of an end user device;
sending, by the administrative network device, an acknowledgment request to the end user device;
determining, by the administrative network device, if an acknowledgement is received from the end user device in response to the acknowledgement request;
if the acknowledgement is not received at the administrative network device from the end user device:
determining, based on a comparison of the received current browsing information with stored historical information associated with the MAC address of the end user device, whether the MAC address of the end user device has been spoofed.

16. The non-transitory computer-readable medium of claim 15, wherein the current browsing information is stored in the edge network device.

17. The non-transitory computer-readable medium of claim 15, wherein the edge network device is a wireless access point directly connected to the end user device.

18. The non-transitory computer-readable medium of claim 15, wherein the edge network device stores a table including a plurality of entries, wherein each entry of the plurality of entries includes browsing information uniquely associated with one of a plurality of MAC addresses.

19. The non-transitory computer-readable medium of claim 18, wherein each of the plurality of MAC addresses uniquely identifies one of a plurality of end user devices, wherein each of the plurality of end user devices has directly connected to the edge network device.

\* \* \* \* \*